United States Patent
Boscolo et al.

(10) Patent No.: US 7,164,250 B2
(45) Date of Patent: Jan. 16, 2007

(54) OPEN-LOOP VOLTAGE DRIVING OF A DC MOTOR

(75) Inventors: Michele Boscolo, Sottomarina (IT); Paolo Capretta, Longmont, CO (US)

(73) Assignee: STMicroelectronics S.r.l, Agrate Brianza (IT)

( * ) Notice: Subject to any disclaimer, the term of this patent is extended or adjusted under 35 U.S.C. 154(b) by 0 days.

(21) Appl. No.: 11/051,607

(22) Filed: Feb. 4, 2005

(65) Prior Publication Data

US 2005/0174074 A1 Aug. 11, 2005

(30) Foreign Application Priority Data

Feb. 6, 2004 (IT) .................... VA2004A0004

(51) Int. Cl.
*G05B 11/01* (2006.01)
*G11B 15/18* (2006.01)

(52) U.S. Cl. .................. 318/560; 318/254; 318/432; 318/479; 360/71

(58) Field of Classification Search ............. None
See application file for complete search history.

(56) References Cited

U.S. PATENT DOCUMENTS

| | | | | |
|---|---|---|---|---|
| 4,698,745 A * | 10/1987 | Hiroi et al. | ............ | 700/45 |
| 5,111,349 A * | 5/1992 | Moon | ............ | 360/78.07 |
| 5,272,423 A * | 12/1993 | Kim | ............ | 318/560 |
| 5,663,625 A * | 9/1997 | Sato et al. | ............ | 318/701 |
| 5,723,965 A * | 3/1998 | Yim | ............ | 318/601 |
| 5,742,138 A * | 4/1998 | Kato et al. | ............ | 318/568.18 |
| 5,818,651 A * | 10/1998 | Nomura | ............ | 360/78.06 |
| 5,917,672 A * | 6/1999 | Pham et al. | ............ | 360/78.09 |
| 6,339,303 B1 * | 1/2002 | Heeren | ............ | 318/254 |
| 6,470,225 B1 * | 10/2002 | Yutkowitz | ............ | 700/44 |
| 6,617,817 B1 * | 9/2003 | Hill | ............ | 318/560 |
| 6,684,114 B1 * | 1/2004 | Erickson et al. | ............ | 700/45 |
| 6,700,344 B1 * | 3/2004 | Krishnamoorthy et al. | ............ | 318/461 |
| 6,762,901 B1 * | 7/2004 | Hill | ............ | 360/78.04 |
| 6,909,574 B1 * | 6/2005 | Aikawa et al. | ............ | 360/77.04 |
| 6,940,685 B1 * | 9/2005 | Chrappan Soldavini et al. | ............ | 360/78.06 |
| 2001/0026414 A1 * | 10/2001 | Shibata | ............ | 360/75 |
| 2002/0181137 A1 * | 12/2002 | Kimura et al. | ............ | 360/73.03 |
| 2003/0021057 A1 * | 1/2003 | Hill | ............ | 360/77.02 |
| 2004/0036999 A1 * | 2/2004 | Chrappan Soldavini et al. | ............ | 360/78.04 |
| 2004/0085039 A1 * | 5/2004 | Games et al. | ............ | 318/650 |
| 2004/0245950 A1 * | 12/2004 | Ang et al. | ............ | 318/268 |
| 2005/0174074 A1 * | 8/2005 | Boscolo et al. | ............ | 318/64 |
| 2005/0189893 A1 * | 9/2005 | Boscolo et al. | ............ | 318/270 |
| 2006/0012323 A1 * | 1/2006 | Endo et al. | ............ | 318/432 |
| 2006/0061317 A1 * | 3/2006 | Shibata et al. | ............ | 318/611 |

* cited by examiner

*Primary Examiner*—Lincoln Donovan
*Assistant Examiner*—Robert W. Horn
(74) *Attorney, Agent, or Firm*—Lisa K. Jorgenson; Allen, Dyer, Doppelt, Milbrath & Gilchrist, P.A.

(57) ABSTRACT

The driving voltage of the motor is incremented a quantity proportional to the speed of the motor according to a proportionality factor that is adjusted to compensate the back electromotive force. A method includes open-loop voltage control of a DC motor having a certain design speed constant, through a driving signal that is determined for imparting a certain acceleration to the motor and by generating a driving voltage of an output power stage to which the winding of the motor is connected as a function of the driving signal.

15 Claims, 2 Drawing Sheets

OPEN-LOOP VOLTAGE DRIVING OF A DC MOTOR

FIELD OF THE INVENTION

The present invention relates to electric motors, and, more particularly, to a method and circuit for open-loop voltage-mode control of a DC motor, such as for example a voice coil motor (VCM).

BACKGROUND OF THE INVENTION

In many applications it is necessary to drive DC motors with great precision. Electric motors are inductive loads and thus there is a certain delay between a variation of the current circulating in the motor winding(s) and the corresponding voltage variation at the terminals of the motor. The delay is a function of the electrical time constant of the motor. This delay or phase lag complicates the control and may lead to relevant errors in precisely positioning devices moved by the motor.

An important application requiring a precise driving of a motor is that in which a voice coil motor (VCM) is used for shifting read/write heads over the surface of hard disk. There are innumerable applications of voice coil motors, and for sake of simplicity hereinafter this common type of motor will be referred to, although the considerations that will be found to hold, with the appropriate changes, even for other types of DC motors.

Commonly, these motors are controlled in current-mode through a feedback loop that includes a sensing resistor connected in series to the winding of the motor and a control circuit input with the voltage present on the sensing resistor that generates a driving voltage of an output power stage connected to the winding of the motor such to nullify the difference between the current effectively flowing in the motor and the programmed current. Drawbacks connected to this type of driving include that the sensing resistor must be highly precise to minimize driving errors of the motor, and it is a relatively expensive externally connected discrete component. Moreover, at least a pin of the integrated control system device must be dedicated for inputting the voltage drop on the external sensing resistor.

With even larger scale of integration the cost of completely packaged integrated circuits increases with the number of pins. Moreover, realizing feedback loops of current-mode control implies non negligible costs, especially in devices of large scale of integration. An open-loop voltage-mode control is an alternative to the more costly current-mode control because of reduced pin count because a dedicated pin for the sensing resistor is no longer necessary. The delay due to the electrical time constant of the motor may be compensated by using the method and the related driving circuit, disclosed in the patent U.S. Pat. No. 6,617,817, to STMicroelectronics Ltd., comprising a compensation filter for correcting a command signal based upon the nominal value of the admittance of the motor. With the driving circuit disclosed in the cited patent, and depicted in FIG. 1, a DC motor may be controlled in voltage-mode with performances that are comparable with those of a current-mode control.

An undesired effect in driving DC motors includes that when the rotation speed of the rotor increases, the back electromotive force induced in the primary winding, that contrasts the rotation of the rotor, also increases. In current-mode controlled motors, the voltage generated by the back electromotive force is compensated by the feedback loop. By contrast, in voltage-mode controlled motors compensation of the varying back electromotive force must be done with a feed-forward action for preventing a worsening of performances.

VBEMF being the back electromotive force induced voltage in the primary winding, Kt the speed constant, $\omega$ the angular speed of the rotor, V the driving voltage of the motor and VMOTOR the effective excitation voltage of the armature of the motor, the following equations hold:

$$VBEMF(t) = -Kt \cdot \omega(t) \quad (1)$$

$$VMOTOR(t) = V(t) - Kt \cdot \omega(t) \quad (2)$$

The published patent application U.S. 2003/0021057 discloses a compensation method and circuit, shown in FIG. 2, of the back electromotive force VBEMF of a voltage-mode controlled motor. To compensate the back electromotive force VBEMF, it is necessary to know at each instant the speed of the motor. To this purpose, a signal CALCULATED_VELOCITY, is generated by sensing the speed of the motor at pre-established instants and interpolating the sampled values in the intervals between successive samplings. According to the method disclosed in the above mentioned patent application, the voltage VBEMF is compensated by determining the parameters of a compensation filter, VBEMF_COMPENSATOR, in function of the value of the design speed constant Kt of the motor.

Unfortunately, the speed constant Kt varies during the operation of the motor, primarily because of the heating up of the windings, and it may differ significantly from its design value, thus the method disclosed in the cited patent application does not ensure a sufficiently accurate compensation of the back electromotive force for applications in which a precise driving of the motor is required.

SUMMARY OF THE INVENTION

The present invention provides a method of open-loop voltage control of a DC motor that addresses the above mentioned problems.

According to the invention, the driving voltage of the motor is incremented by a quantity proportional to the speed of the motor according to a proportionality factor that is adjusted to compensate the back electromotive force. More precisely, the invention provides a method of open-loop voltage control of a DC motor having a certain design speed constant, through a driving signal that is determined for imparting a certain acceleration to the motor and by generating a driving voltage of an output power stage to which the winding of the motor is connected in function of the driving signal.

The back electromotive force in the stator winding is compensated by: driving the motor with a driving signal the value of which is such to correspond to the generation of a certain constant acceleration depending on the electrical and mechanical parameters of the motor; monitoring the produced acceleration of the motor in a certain time interval; and regulating the driving voltage by incrementing it of a quantity proportional to the speed of the motor according to a proportionality factor such that any variation of the acceleration imparted to the motor in the time interval will be smaller than a certain maximum value.

This method, that may be easily implemented in an open-loop voltage-mode control circuit of a DC motor, also provides for the determination of the effective value of the speed constant of the motor, that is the proportionality factor that should be used in actuating the compensating feed-forward action.

BRIEF DESCRIPTION OF THE DRAWINGS

The different aspects and advantages of the invention will be even more evident through a detailed description referring to the attached drawings, wherein.

DETAILED DESCRIPTION OF THE PREFERRED EMBODIMENTS

The open-loop driving method of this invention substantially includes increasing the driving voltage V of the motor of a quantity proportional to the speed of the motor ω according to a proportionality factor Kt* the value of which is continuously determined to precisely compensate the back electromotive force VBEMF.

Figure 1:
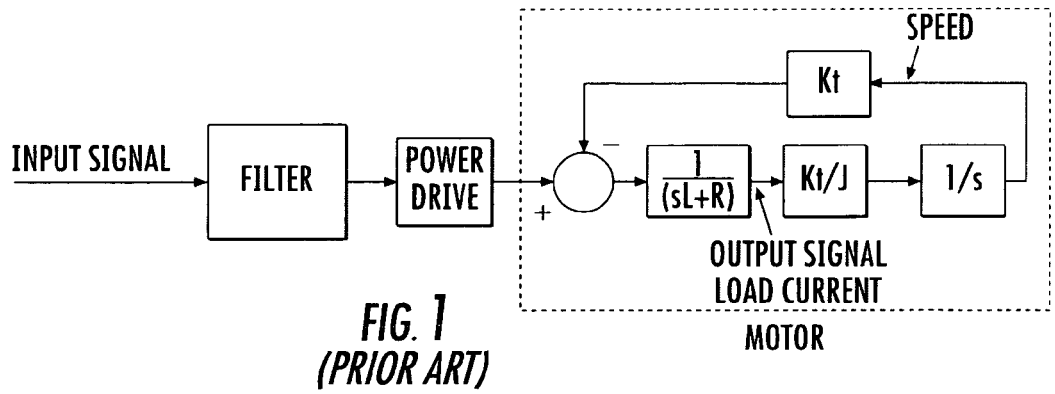
FIG. 1 is a schematic diagram showing a known driving circuit of a DC motor.
Figure 2:
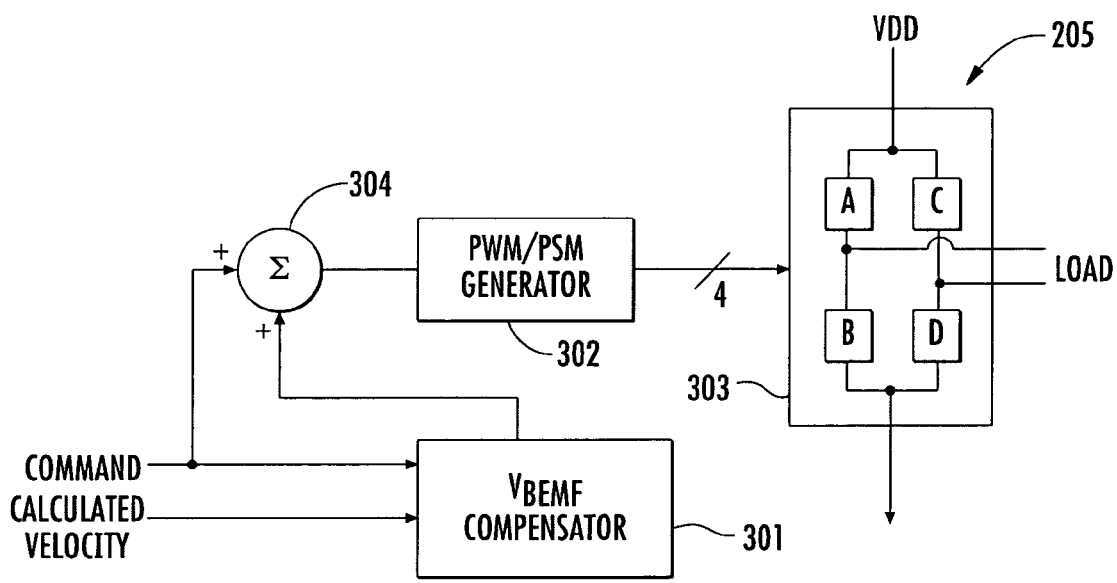
FIG. 2 is a schematic diagram showing the driving circuit of a DC motor disclosed in the patent application US 2003/0021057.
Figure 3:
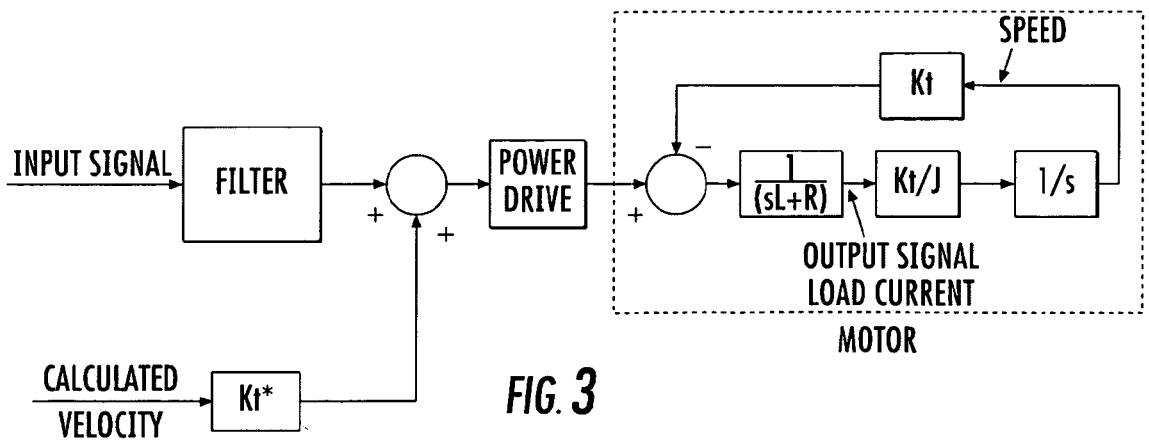
FIG. 3 is a schematic diagram showing a driving circuit of a DC motor according to the present invention.

This may be done very simply with the driving circuit of FIG. 3, similar to that of the prior art depicted in FIG. 2, with the addition of the output driving voltage of the compensation filter FILTER being incremented by the quantity Kt*·ω, in a compensation block that may have some gain. Therefore, the equation that describes the effective excitation voltage of the armature circuit VMOTOR is no longer equation (2) of the prior art, but the following:

$$VMOTOR(t)=V(t)+Kt^*\cdot\omega(t)-Kt\cdot\omega(t) \qquad (3)$$

Figure 4:
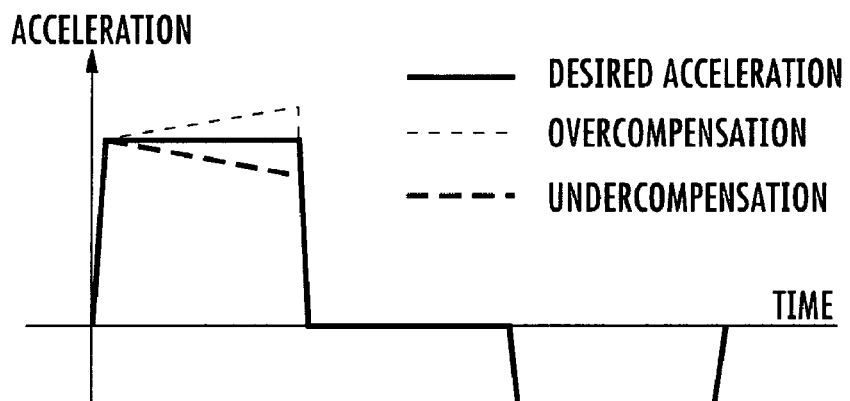
FIG. 4 is a timing diagram illustrating a comparison of accelerations imparted to the motor when the back electromotive force in the armature circuit is overcompensated or undercompensated.

The value of the proportionality factor Kt* is constantly defined to precisely compensate the back electromotive force. Clearly, if Kt*>Kt or Kt*<Kt, the back electromotive force VBEMF is undercompensated or overcompensated. When a certain desired acceleration to the motor must be imparted, such as that illustrated in FIG. 4, the effective acceleration of the motor will not be constant but will increase or decrease proportionally to the rotation speed of the motor. The speed of the motor may be conveniently represented by the signal CALCULATED_VELOCITY, that may be generated as in the prior art device represented in FIG. 2, or alternatively by a signal generated by continuously detecting the speed of the motor.

According to the method of this invention, a "seek" operation (or a plurality of operations) are carried out, including driving the motor with a command signal, INPUT SIGNAL, the value of which is calculated in function of electrical and mechanical parameters of the motor for imparting a constant acceleration, for detecting in an observation time interval the acceleration that is effectively produced. If in this time interval the acceleration is substantially constant, that is the absolute value of its eventual variations are smaller than a pre-established maximum, this means that the back electromotive force VBEMF is compensated and thus the proportionality factor Kt* substantially coincides with the design speed constant Kt of the motor.

Figure 5:
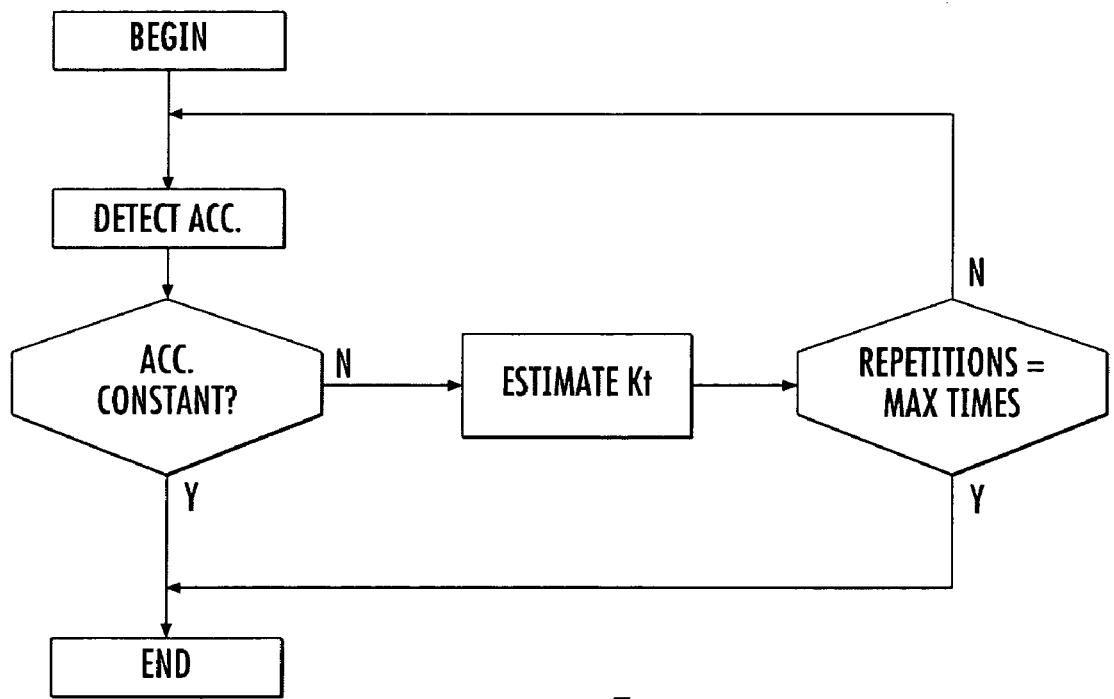
FIG. 5 is a flow-chart of a preferred embodiment of the method of the invention for determining the real speed constant of the motor.

The value of the proportionality factor Kt* is preferably determined with the iterative procedure shown in FIG. 5.

Initially, the proportionality factor Kt* is assumed equal to the design value of the speed constant, then a "seek" operation is carried out by detecting the effective acceleration, ACC, in an observation time interval. If the effective acceleration is not constant, the proportionality factor Kt* is modified and another "seek" operation is carried out.

Preferably, to prevent that these operations be repeated to infinity, which may happen when other causes rather or besides the back electromotive force VBEMF affects the effective acceleration of the motor, a certain maximum number of times these operations may be carried out is set. The proportionality factor Kt* may be corrected via a constant step algorithm, that is an algorithm that contemplates increasing or reducing the value of Kt* by a pre-established quantity each time that a "seek" operation is carried out, or via a variable step algorithm. Preferably, a variable step algorithm is adopted, as the one described hereinbelow.

$Kt_{Nom}$ being the nominal (design) value of the speed constant and $Kt_{SPREAD}$ a maximum possible value of variation of the speed constant, at the i-th "seek" operation a new value of the proportionality factor $Kt^*_i$ is evaluated in function of the value determined with the previous "seek" operation $Kt^*_{i-1}$ according to the following equation:

$$Kt^*_i = Kt^*_{i-1} \pm \frac{2\cdot Kt_{SPREAD}}{2^i}$$

As an alternative, the factor Kt* may be corrected many times during the same "seek" operation.

It should be noted that the method of this invention functions independently from the value of the DC gain of the compensation filter FILTER, which is a parameter that may be established to satisfy other specifications of the control system of the motor.

That which is claimed is:

1. A method of open-loop voltage control of a DC motor having a predetermined speed constant, the method comprising:
    driving the motor with a command signal to produce a constant acceleration of the DC motor;
    generating a driving voltage with a filter for an output power stage connected to the winding of the DC motor based upon the command signal;
    sensing an effective acceleration of the DC motor during a time interval;
    compensating the driving voltage of the output power stage by incrementing it an amount proportional to a speed of the motor according to a proportionality factor such that during such time interval the acceleration of the DC motor does not vary in absolute value of more than a pre-established maximum value; and
    determining an effective speed constant of the DC motor by determining said effective speed constant of the DC motor to be equal to the proportionality factor.

2. The method of claim 1, wherein the compensating is carried out iteratively and comprises the following sequence:
    a) setting the proportionality factor equal to the predetermined speed constant;
    b) ending the compensating if the absolute value of variations of the acceleration of the DC motor is less than the pre-established maximum value, otherwise
       b1) adjusting the proportionality factor by a pre-established amount, b2) driving the DC motor with an adjusted command signal, and b3) sensing the effective acceleration of the DC motor during the time interval and continuing the sequence at step b).

3. The method of claim 2, wherein the pre-established amount is halved at each iteration.

4. A method of controlling a motor having a predetermined speed constant, the method comprising:

driving the motor with a command signal to produce a constant acceleration of the motor;

generating a driving voltage with a filter for the motor based upon the command signal;

sensing an effective acceleration of the motor during a time interval; and compensating the driving voltage by incrementing it based upon a speed of the motor so that during such time interval the acceleration of the motor does not vary by more than a pre-established maximum variation; and determining an effective speed constant of the motor based upon the proportionality factor.

5. The method of claim 4, wherein the compensating includes incrementing the driving voltage based upon a speed of the motor according to a proportionality factor, and comprises:

a) setting the proportionality factor equal to the predetermined speed constant;

b) ending the compensating if variations of the acceleration of the motor are less than the pre-established maximum variation, otherwise b1) adjusting the proportionality factor by a pre-established amount, b2) driving the motor with an adjusted command signal, and b3) sensing the effective acceleration of the motor during the time interval.

6. The method of claim 5, wherein the pre-established amount is halved at each iteration.

7. An open-loop voltage mode control circuit of a DC motor having a predetermined speed constant, comprising:

a driving circuit generating a command signal to produce an acceleration of the motor;

an output power stage connected to a winding of the motor;

a filter receiving the command signal and generating a driving voltage for the output power stage; and a compensation circuit to compensate the driving voltage for the output power stage by incrementing it based upon a speed of the motor according to a proportionality factor such that during a time interval the acceleration of the motor does not vary by more than a pre-established maximum variation;

wherein an effective speed constant of the motor is determined based upon the proportionality factor.

8. The control circuit of claim 7, wherein the compensation circuit increments the driving voltage, based upon a speed of the motor according to a proportionality factor, and includes a) setting the proportionality factor equal to the predetermined speed constant;

b) ending the compensating if variations of the acceleration of the motor are less than the pre-established maximum variation, otherwise b1) adjusting the proportionality factor by a pre-established amount, b2) driving the motor with an adjusted command signal, and b3) sensing the effective acceleration of the motor during the time interval.

9. The control circuit of claim 8, wherein the pre-established amount is halved at each iteration.

10. A method of open-loop voltage control of a DC motor having a predetermined speed constant, the method comprising:

driving the motor with a command signal to produce a constant acceleration of the DC motor;

generating a driving voltage with a filter for an output power stage connected to the winding of the DC motor based upon the command signal;

sensing an effective acceleration of the DC motor during a time interval; and compensating the driving voltage of the output power stage by incrementing it an amount proportional to a speed of the motor according to a proportionality factor such that during such time interval the acceleration of the DC motor does not vary in absolute value of more than a pre-established maximum value;

wherein the compensating is carried out iteratively and comprises the following sequence a) setting the proportionality factor equal to the predetermined speed constant, b) ending the compensating if the absolute value of variations of the acceleration of the DC motor is less than the pre-established maximum value, otherwise b1) adjusting the proportionality factor by a pre-established amount, b2) driving the DC motor with an adjusted command signal, and b3) sensing the effective acceleration of the DC motor during the time interval and continuing the sequence at step b).

11. The method of claim 10, wherein the pre-established amount is halved at each iteration.

12. A method of controlling a motor having a predetermined speed constant, the method comprising;

driving the motor with a command signal to produce a constant acceleration of the motor;

generating a driving voltage with a filter for the motor based upon the command signal;

sensing an effective acceleration of the motor during a time interval; and compensating the driving voltage by incrementing it based upon a speed of the motor so that during such time interval the acceleration of the motor does not vary by more than a pre-established maximum variation;

wherein the compensating includes incrementing the driving voltage based upon a speed of the motor according to a proportionality factor, and comprises a) setting the proportionality factor equal to the predetermined speed constant, b) ending the compensating it variations of the acceleration of the motor are less than the pre-established maximum variation, otherwise b1) adjusting the proportionality factor by a pre-established amount, b2) driving the motor with an adjusted command signal, and b3) sensing the effective acceleration of the motor during the time interval.

13. The method of claim 12, wherein the pre-established amount is halved at each iteration.

14. An open-loop voltage mode control circuit of a DC motor having a predetermined speed constant, comprising:
- a driving circuit generating a command signal to produce an acceleration of the motor;
- an output power stage connected to a winding of the motor;
- a filter receiving the command signal and generating a driving voltage for the output power stage; and
- a compensation circuit to compensate the driving voltage for the output power stage by incrementing it based upon a speed of the motor according to a proportionality factor such that during a time interval the acceleration of the motor does not vary by more than a pre-established maximum variation;
- wherein the compensation circuit increments the driving voltage based upon a speed of the motor according to a proportionality factor, and includes
  - a) setting the proportionality factor equal to the predetermined speed constant;
  - b) ending the compensating if variations of the acceleration of the motor are less than the pre-established maximum variation, otherwise
    - b1) adjusting the proportionality factor by a pre-established amount,
    - b2) driving the motor with an adjusted command signal, and
    - b3) sensing the effective acceleration of the motor during the time interval.

15. The control circuit of claim 14, wherein the pre-established amount is halved at each iteration.

* * * * *

UNITED STATES PATENT AND TRADEMARK OFFICE
CERTIFICATE OF CORRECTION

PATENT NO. : 7,164,250 B2
APPLICATION NO. : 11/051607
DATED : January 16, 2007
INVENTOR(S) : Boscolo et al.

It is certified that error appears in the above-identified patent and that said Letters Patent is hereby corrected as shown below:

Column 6, Line 57    Delete: "it"
                     Insert: --if--

Signed and Sealed this

Tenth Day of July, 2007

JON W. DUDAS
*Director of the United States Patent and Trademark Office*